Sept. 11, 1956     K. B. PITMAN     2,762,462
BRAKE FOR GARDEN TRACTORS
Filed March 8, 1954                           2 Sheets-Sheet 1
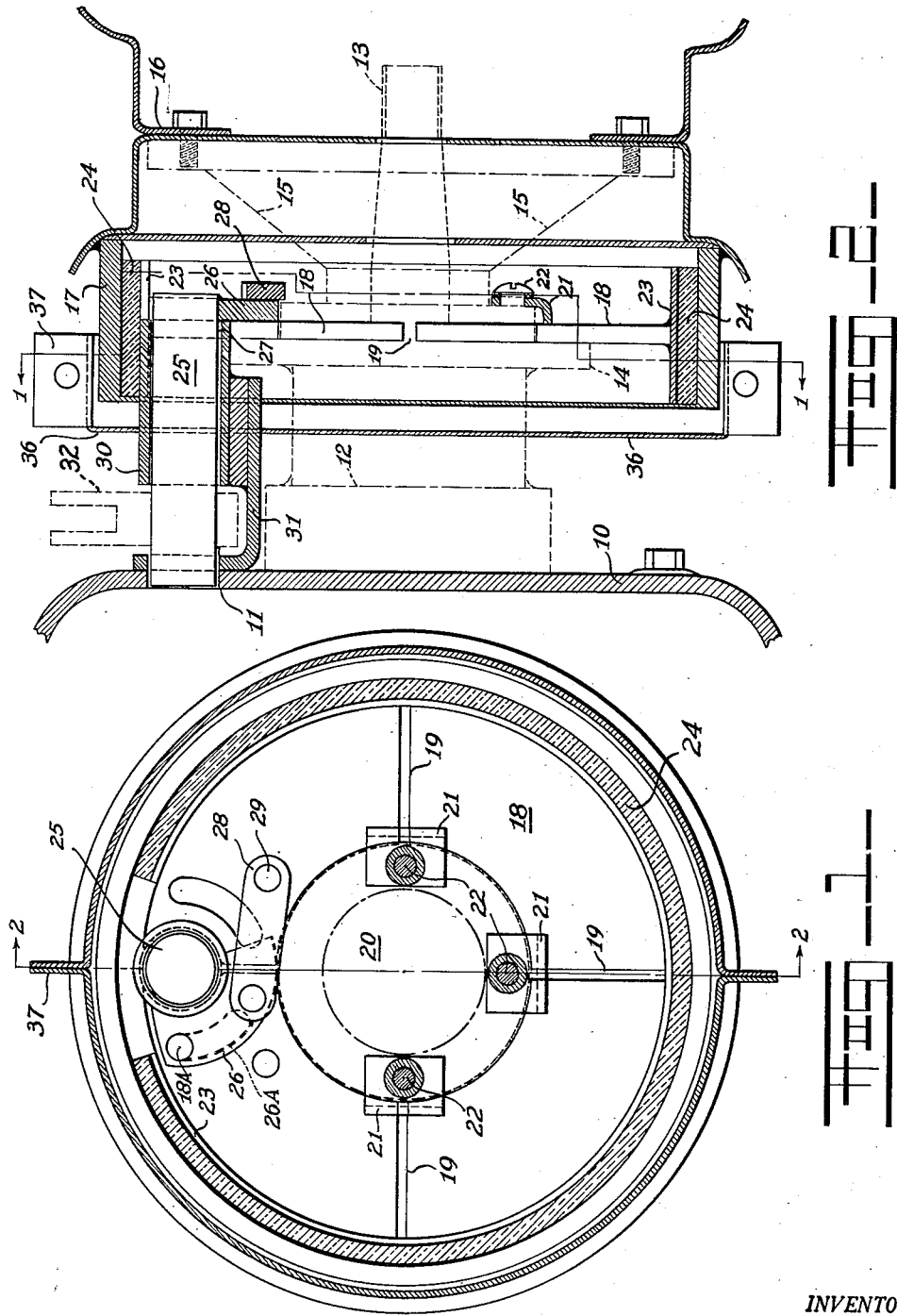
INVENTOR.
Kenneth B. Pitman
BY
W. B. Harpman
ATTORNEY Sept. 11, 1956　　　　K. B. PITMAN　　　　2,762,462
BRAKE FOR GARDEN TRACTORS
Filed March 8, 1954．　　　　　　　　　　2 Sheets-Sheet 2
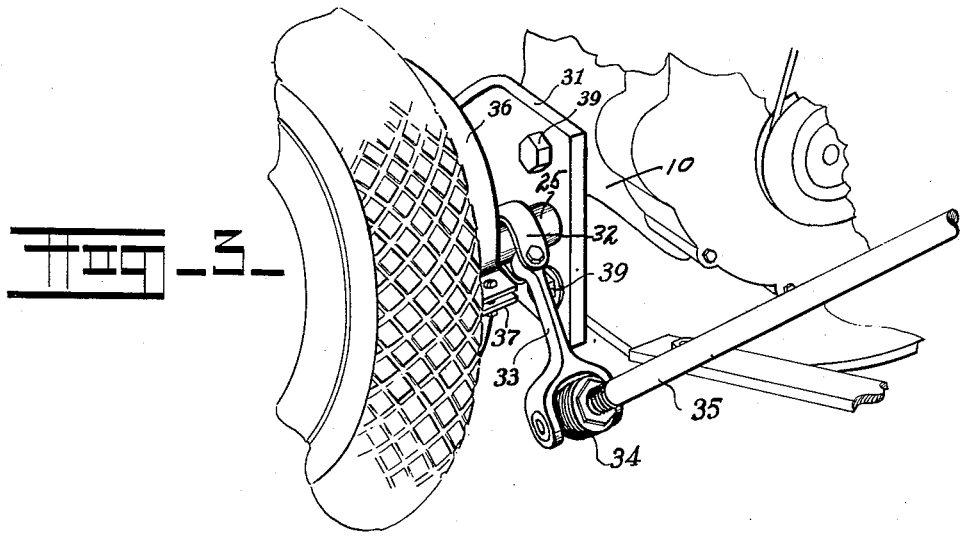
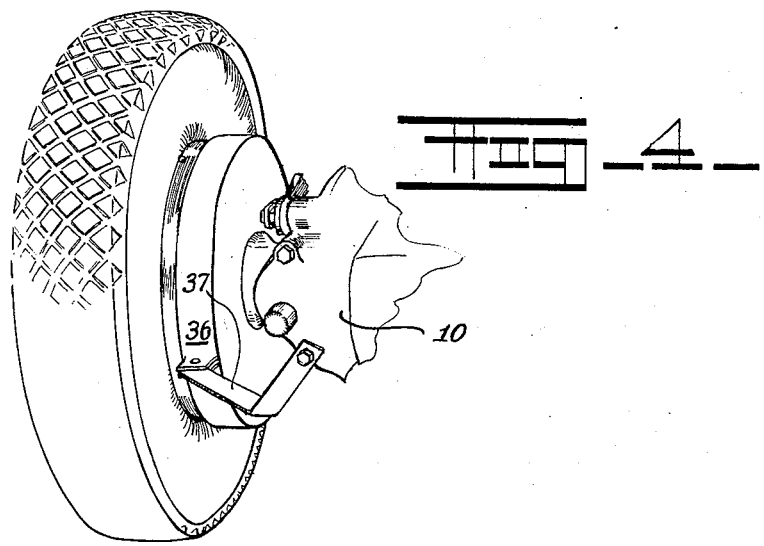
INVENTOR.
Kenneth B. Pitman
BY
ATTORNEY United States Patent Office 2,762,462
Patented Sept. 11, 1956

2,762,462
BRAKE FOR GARDEN TRACTORS

Kenneth B. Pitman, Youngstown, Ohio, assignor to Pitman Wheel and Brake Inc., Austintown, Ohio, a corporation of Ohio Application March 8, 1954, Serial No. 414,622

3 Claims. (Cl. 188—78)

This invention relates to a brake attachment for a garden tractor and more particularly to a brake attachment which may be applied to a garden tractor as an accessory and used for steering the garden tractor by selectively controlling each of the wheels thereof.

The principal object of the invention is the provision of a brake attachment for a garden tractor.

A further object of the invention is the provision of a brake attachment which may be applied to a garden tractor as an accessory.

A still further object of the invention is the provision of a brake for a garden tractor comprising a wheel supporting a brake drum and an internally expanding brake band for engagement thereagainst.

A still further object of the invention is the provision of a brake for a garden tractor which is of simple economical construction capable of quick and easy application to a garden tractor by an unskilled workman.

The brake for a garden tractor disclosed herein comprises an attachment or accessory which may be applied to a conventional two-wheel garden tractor of the sort commonly used for elevating, lawn mowing, snow plowing, etc., and which tractors are provided with differential mechanisms in their axle constructions. Such tractors have not heretofore been equipped with brakes and neither have they been provided with any means facilitating steering of the same.

The present invention relates to a brake attachment which may be applied to such tractors and individually controlled with respect to each of the wheels so that the precise control of the tractor is obtained and, more importantly, power steering is realized as by individual braking wheels the tractor may be forcefully turned in the desired direction.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a cross sectional elevation of the brake attachment.

Figure 2 is a vertical section taken on line 2—2 of Figure 1. Line 1—1 on Figure 2 indicates the section of Figure 1.

Figure 3 is a perspective view of a portion of a garden tractor showing the control arm of the brake attachment.

Figure 4 is a perspective view of a portion of a garden tractor taken from the opposite side with respect to the view of Figure 3 showing the mounting bracket of the brake attachment.

By referring to the drawings and Figures 1 and 2 in particular it will be seen that a portion of the axle housing 10 of the garden tractor is disclosed, the axle housing 10 having an opening 11 therein in addition to an extension 12 through which an axle 13 is positioned. The extension 12 has an annular flanged section 14 which provides an abutment against which a hub 15 on the axle 13 is positioned. The hub 15 detachably receives a rim 16 which in turn receives a pneumatic tire or, alternately, serves as a mounting for a roller type steel wheel, as desired.

A brake drum 17 is secured as by welding to the rim 16 and extends inwardly toward the axle housing 10 and over the extension 12 thereof. The brake drum 17 thus revolves with the rim 16 on the axle 13. A disc 18 having four radially extending circumferentially spaced slots 19 therein extending outwardly from a central opening 20 is positioned over the outermost portion of the extension 12 and adjacent the flange 14 thereof and held in position thereon by a plurality of retainer plates 21—21 which in turn are attached to the extension 12 beyond the flange 14 by fasteners 22—22. The disc 18 has a brake band 23 secured to its peripheral edge and the brake band 23 has brake lining 24 thereabout for engagement within the brake drum 17.

In order that the disc 18 may be distorted so as to in effect move the several segments thereof away from one another and expand the area of the brake band 23, a cam shaft 25 having a cam 26 on one end thereof is positioned through an opening 27 in the disc 18. The cam 26 has a link 28 secured thereto which extends to a pivot pin 29 which is attached to the disc 18 in spaced relation to the cam 26.

It will thus be seen that rotation of the cam shaft 25 will move the cam 26 and hence the link 28 so that the portion of the disc 18 that is pivotally connected as by the pivot 29 to the link 28 will be moved away from the adjacent portion thereof and thus expand the brake band 23.

It will be observed that the brake band 23 is not a complete annular band but extends only in a semicircle from points spaced on either side of the cam shaft 25. The outermost end of the cam shaft 25 is positioned within the opening 11 in the housing 10 of the tractor and is thereby secured against twisting motion.

The intermediate portion of the cam shaft 25 is positioned in a tubular bracket 30 which is positioned on one end of an L-shaped extension 31 which is apertured and positioned over the outermost end of the cam shaft 25 adjacent its positioning in the opening 11 as heretofore referred to.

A pin 18A in one side of the cam 26 is engaged in a slot 26A in the disc 18 to effectively hold the disc 18 against rotation when the cam 26 and link 28 act to move the segments of the disc 18 and expand the band 23.

A clevis 32 is secured to the cam shaft 25 adjacent its outermost end and provides means for attaching an operating lever 33 as may be seen in Figure 3 of the drawings. The operating lever 33 is extended through a universal 34 and shaft 35 to a point adjacent the control handles of the tractor so that movement of the same will impart motion to the cam shaft 25 and hence operate the brake band 23 by expanding and contracting the same with respect to the brake drum 17.

In order that the mechanism just described may be protected and enclosed, a dust pan 36 is positioned about the brake drum 17 in spaced relation thereto and is provided with outturned brackets 37 which are secured to the garden tractor axle housing 10, as best seen in Figure 4 of the drawings.

The dust pan 36 thus encloses the operative portions and prevents the entry of foreign material into the area between the brake band 23 and brake drum 17. It is provided with an opening through which the axle extension 12 extends, as best shown in Figures 2 and 4 of the drawings.

The offset L-shaped extension 31 is shown in Figures 2 and 3 of the drawings. By referring to Figure 3 of the drawings it will be seen that the offset L-shaped extension 31 is also provided with a pair of spaced openings through which openings bolts 39 are secured to the tractor 10 replacing the bolts originally serving to secure a closure plate to the tractor at this point. The entire brake assembly will thus be seen to be capable of attachment to an existing garden tractor without altering the tractor or in any way adversely affecting the utility or operation thereof.

The brakes, when installed, operate to control each wheel of the garden tractor 10 individually and act by internal expansion of the brake band 23 on the segmented disc 18 in an effective internally expanding action. Springs may be used to return the brake band 23 to normal retracted position where the brake lining 24 will be out of contact with the brake drum 17.

It will thus be seen that the several objects of the invention are met by the brake for garden tractors disclosed herein.

Having thus described my invention, what I claim is:

1. In combination with a garden tractor having an axle and a housing thereabout, a portion of said axle housing forming an annular flanged tubular extension adapted to receive a wheel hub, a brake comprising a multi-part centrally apertured disc mounted on said flanged extension of said axle housing, a brake band secured to the peripheral edge of said multi-part disc, said disc having oppositely disposed arcuate slots therein, a cam shaft having a cam and levers thereon moving adjacent portions of said multi-part disc toward and away from one another so as to expand and contract said band, a brake drum secured to said wheel hub and revolvable about said brake band.

2. The combination set forth in claim 1 wherein the multi-part disc is loosely secured to said axle housing by a plurality of retainer plates fastened thereto.

3. The improvement in tractor brakes comprising a disc having a split band secured to its peripheral edge, said disc having a central opening and a plurality of radially extending circumferentially spaced slots therein extending from said opening to said band, means for mounting said disc on an axle housing of a garden tractor, oppositely disposed arcuate slots in said adjacent sections of said disc adjacent the ends of said split band, a cam shaft positioned transversely of said disc, a cam on said shaft, a pivot pin on said cam engaging one slot in said disc and a lever on said cam, a pivot pin on said lever engaging the adjacent portion of said disc and a brake drum positioned about said band, said band being movable into engagement with said brake drum responsive to motion imparted to said cam, said tractor having an axle, a hub on said axle, said brake drum being mounted on said hub.

References Cited in the file of this patent
UNITED STATES PATENTS

| | | |
|---|---|---|
| 1,828,761 | Brawner | Oct. 27, 1931 |
| 1,888,691 | Pearson | Nov. 22, 1932 |
| 2,202,454 | Kaufmann | May 28, 1940 |